Feb. 11, 1969 M. E. BRADLEY ETAL 3,427,494
CORRECTED DEFLECTION CIRCUIT FOR CATHODE RAY TUBE
Filed Oct. 28, 1965
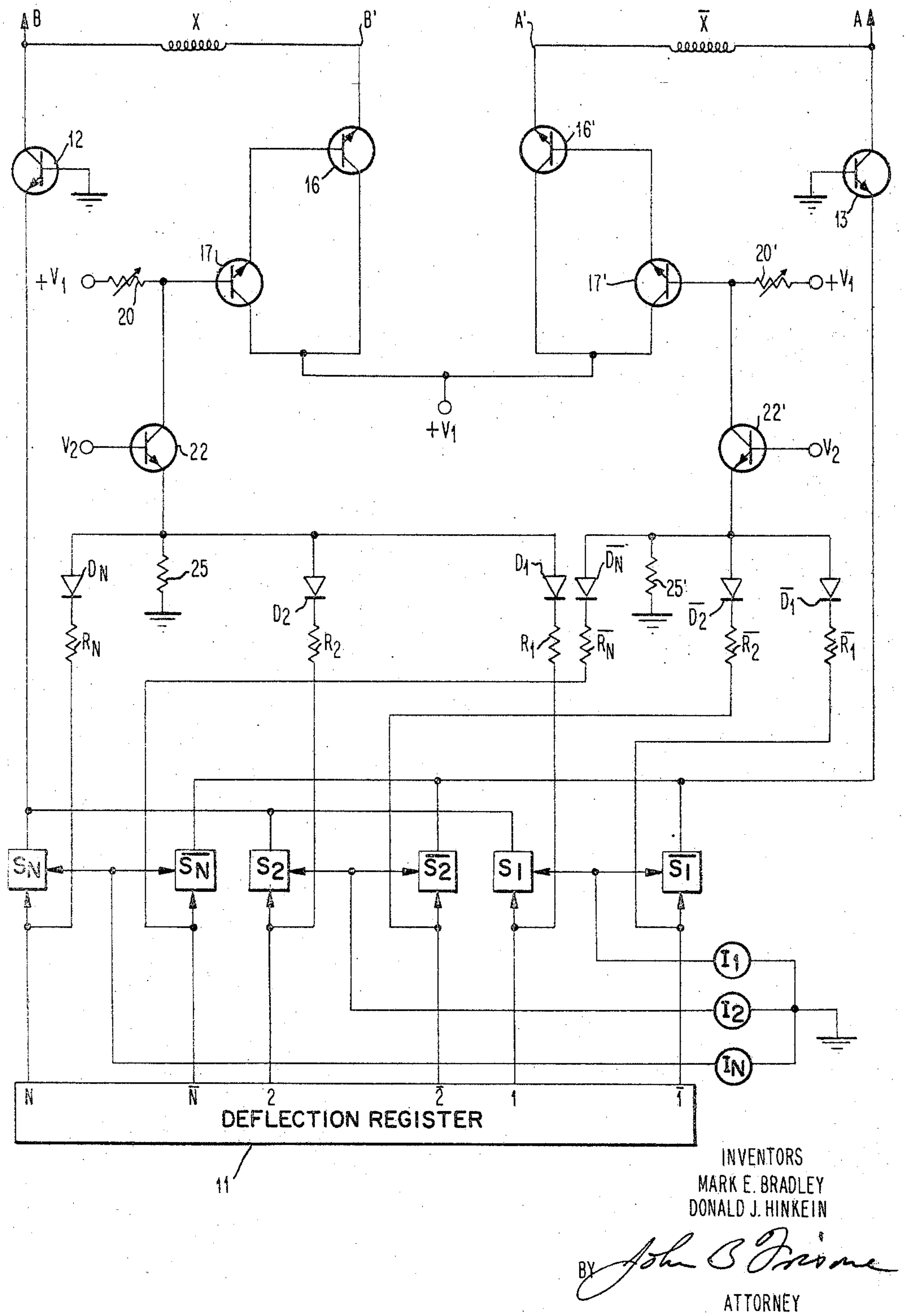
INVENTORS
MARK E. BRADLEY
DONALD J. HINKEIN
BY John B Frisone
ATTORNEY United States Patent Office 3,427,494

Patented Feb. 11, 1969

3,427,494

CORRECTED DEFLECTION CIRCUIT FOR CATHODE RAY TUBE

Mark E. Bradley, Red Hook, and Donald J. Hinkein, Germantown, N.Y., assignors to International Business Machines Corporation, Armonk, N.Y., a corporation of New York Filed Oct. 28, 1965, Ser. No. 505,476

U.S. Cl. 315—27 5 Claims

Int. Cl. H01j *29/70*

ABSTRACT OF THE DISCLOSURE

A voltage corrected electromagnetic deflection circuit for cathode ray display devices includes means for supplying deflection current to one terminal of a deflection winding and corresponding means for establishing the voltage at the other terminal of the winding to compensate for the voltage drop across the winding due to steady state deflection currents.

This invention relates to computer controlled cathode ray tube displays and more particularly, to a corrected deflection circuit for use in the deflection systems of such displays.

Digital computer controlled cathode ray displays are particularly suited to the use of step currents for producing beam deflections since the computer supplies a digital signal defining the line to be displayed by beam deflections. These signals are generally binary coded and are quite suitable for switching binarily weighted current sources which may be summed to provide step currents which produce the desired beam deflection.

Such systems, however, introduce undesirable effects, such as, beam intensity modulation, non-linearities, defocus, etc., which require correction. Correction may be controlled by sampling the deflection windings and utilizing the sampled voltages to generate correction signals. Since an asynchronous system is desired, due to time savings and other economies, direct current (D.C.) coupling of the sampled voltage is necessary. The windings, however, have a finite D.C. resistance and, due to the wide variation in the currents therethrough for varying conditions of beam deflection, do not provide a constant D.C. voltage level.

It is therefore one object of this invention to provide a deflection circuit for use in cathode ray display tubes employing electromagnetic deflection which maintains a substantially constant direct current voltage reference at the windings over the entire range of deflections.

Another object of the invention is to provide a deflection circuit which is inexpensive to manufacture and reliable in operation.

The invention contemplates an electromagnetic deflection circuit comprising a deflection winding, first means responsive to control signals for supplying deflection currents corresponding in magnitude thereto, second means responsive to said signals for providing a voltage corresponding thereto, and means including a source of reference voltage responsive to the voltage supplied by said second means for controlling the voltage of the winding as a function of the current supplied whereby one winding end is at a substantially fixed reference potential for all steady state conditions of deflection current.

The foregoing and other objects, features and advantages of the invention will be apparent from the following more particular description of a preferred embodiment of the invention as illustrated in the accompanying drawing.

The single figure is a schematic diagram of a novel deflection circuit constructed according to the invention.

In the drawing, the invention is illustrated in a push-pull electromagnetic deflection system which has a winding X and $\overline{X}$ for producing horizontal deflections. A vertical deflection system is not shown since it would be a duplicate of the one shown except for the orientation of the windings with respect to the electron beam of the cathode ray tube.

Windings X and $\overline{X}$ are supplied with push pull currents proportional to beam deflection. The sum of the magnitudes of the two currents is constant and equals $$I_1+I_2\ .\ .\ .\ +I_n$$

where $I_1$, $I_2$ and $I_n$ are binarily weighted current sources and are illustrated in the lower right portion of the drawing. Source $I_1$ is connected to switches $\overline{S}_1$ and $S_1$. Source $I_2$ is connected to switches $\overline{S}_2$ and $S_2$ and source $I_n$ is connected to switches $\overline{S}_n$ and $S_n$. A deflection register 11 contains in binary code the X coordinate of the position the beam is to be moved to. This register has *n* bipolar outputs which control the switches S and $\overline{S}$. The S switches are connected to winding X by a buffer amplifier 12 and the $\overline{S}$ switches are connected to the $\overline{X}$ winding by a buffer amplifier 13. With this arrangement, the sum of the magnitudes of the current through windings X and $\overline{X}$ is constant and changing the contents of register 11 produces via switches S and $\overline{S}$ a differential change in current through the windings X and $\overline{X}$ which causes the beam to move in the X direction to a position corresponding to the new value inserted in register 11.

If the deflection register is all zeros or all ones, windings X and $\overline{X}$ have maximum and minimum currents therethrough. Under these conditions, the current may vary by as much as 800 mils causing wide difference in the D.C. voltage level at the points A and B where the winding voltages must be sampled for control purposes. These differences are caused by the D.C. impedance of the windings and the wide variation of currents (0–800 mils) therethrough. The discussion thus far is based on the assumption that points A′ and B′ of windings X and $\overline{X}$ are at a fixed D.C. potential.

However, according to the invention, the potential of points A′ and B′ is made to vary as a function of the steady state current through the windings as determined by switches $\overline{S}$ and S, respectively. The B′ end of winding X is connected to a fixed source of reference potential $+V_1$ by a pair of transistors 16 and 17 in a Darlington connection and a potentiometer 20. Transistor 17 and 16 constitute an emitter follower driving a second emitter follower and provide unity voltage gain from the base of transistor 17 to the emitter of transistor 16. This arrangement was selected due to the current carrying requirements (0–800 mils). A similar circuit using transistor 16′ and 17′ and a potentiometer 20′ connects end A′ of winding $\overline{X}$ to source $+V_1$.

A correction voltage proportional to the current through winding X is generated and added to the voltage at the base of transistor 17. This correction voltage will cause the voltage added to the base of transistor 17 via buffer sponding to the drop across winding X caused by the current therethrough to thus maintain point B at a substantially constant steady state voltage. The correction voltage is generated by connecting outputs 1, 2 and *n* of register 11 to the base of transistor 17 via binarily weighted resistors $R_1$, $R_2$ and $R_n$; diodes $D_1$, $D_2$ and $D_n$ and buffer amplifier 22. With this arrangement of binarily weighted resistors, the voltage added to the base of transistors 17 via buffer amplifier 22 is proportional to the current supplied by switches S and thus compensates for the voltage drop across winding X to maintain point B at the constant steady state D.C. potential.

Resistors $\overline{R}_1$, $\overline{R}_2$ and $\overline{R}_n$ and diodes $\overline{D}_1$, $\overline{D}_2$ and $\overline{D}_n$ connected between outputs $\overline{1}$, $\overline{2}$ and $\overline{n}$, respectively, of register 11 and buffer amplifier 22′ provide a correction voltage to the base of transistor 17′. It should be noted that the correction voltages applied to points A′ and B′ via the connected transistors are complementary, as are the currents controlled by switches S and $\overline{S}_1$.

Two resistors 25 and 25′ connected between the emitters of buffer amplifier 22 and 22′, respectively, and ground maintain a quiescent current in the amplifiers in the event register 11 is all zeros or all ones, respectively. This is utilized to prevent the amplifiers from turning off and then turning on when the register changes to some other intermediate value.

While the invention has been particularly shown and described with reference to a preferred embodiment thereof, it will be understood by those skilled in the art that various changes in form and detail may be made therein without departing from the spirit and scope of the invention.

What is claimed is:

1. An electromagnetic deflection circuit for use in a cathode ray display device comprising, a deflection winding having first and second terminations, first means responsive to control signals defining the position to which the cathode ray beam is to be moved for supplying deflection currents corresponding to said control signals to the first winding termination, and second means connected to said second winding termination and responsive to said control signals for controlling the voltage of said second termination as a function of the current supplied to the first termination in a manner to compensate for the resistive voltage drop in said winding arising from said currents, whereby the potential of the first termination is substantially unaffected by the voltage drop across the winding due to steady state deflection current.

2. An electromagnetic deflection circuit as set forth in claim 1 in which said control signals are binary coded signals and said second means includes a plurality of binarily weighted impedances each responsive to the corresponding bit position of the binary signal and a buffer amplifier connected thereto for developing a voltage corresponding to the binary value of the coded signal.

3. An electromagnetic deflection circuit as set forth in claim 1 in which said control signals are binary coded signals, said first means includes a plurality of binarily weighted current sources controlled by the corresponding bit positions of the coded signal, and said second means includes a plurality of binarily weighted impedances each responsive to the corresponding bit position of the binary signal and a buffer amplifier connected thereto for developing a voltage corresponding to the binary value of the coded signal.

4. A push-pull electromagnetic deflection circuit for use in a cathode ray display device comprising, a pair of deflection windings each having first and second terminations, first means responsive to control signals defining the position to which the beam is to be moved for differentially incrementing the currents supplied to the first terminations of the windings, second means responsive to said control signals for generating first and second complementary control voltages corresponding thereto, and means including a source of reference voltage connected to said second terminations and responsive to said first and second complementary control voltages for controlling the voltages of the second terminations as a function of the first and second complementary control voltages, respectively, in a manner to compensate for the resistive voltage drops in said windings arising from said currents supplied to said first terminations, whereby the potential of each first termination is substantially unaffected by the voltage drop across its respective winding due to steady state deflection current therethrough.

5. A push-pull electromagnetic deflection circuit as set forth in claim 4 in which said control signals are binary coded signals; and said second means includes a first group of binarily weighted impedances each responsive to the corresponding bit position of the binary signal and a first buffer amplifier connected thereto for developing a control voltage corresponding to the binary value of the coded signal, and a second group of binarily weighted impedances each responsive to the complement of the corresponding bit position of the binary signal and a second buffer amplifier connected thereto for developing a control voltage corresponding to the complement of the binary value of the coded signal.

References Cited

UNITED STATES PATENTS 3,329,862 7/1967 Lemke -------------- 315—27

RODNEY D. BENNETT, *Primary Examiner.*

CHARLES L. WHITHAM, *Assistant Examiner.*